Figure 3:
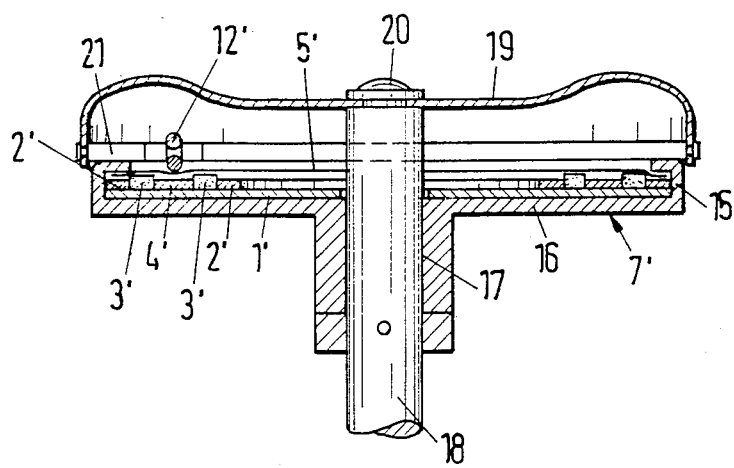

United States Patent [19]

Sachsse

[11] Patent Number: 4,903,002
[45] Date of Patent: Feb. 20, 1990

[54] DISPLACEMENT OR POSITION TRANSDUCER

[75] Inventor: Lothar Sachsse, Weisendorf, Fed. Rep. of Germany

[73] Assignee: Preh, Elektrofeinmechanische Werke, Jakob Preh. Nachf. GmbH & Co., Bad Neustadt/Saale, Fed. Rep. of Germany

[21] Appl. No.: 173,351

[22] Filed: Mar. 25, 1988

[30] Foreign Application Priority Data

Mar. 28, 1987 [DE] Fed. Rep. of Germany ....... 3710286

[51] Int. Cl.$^4$ .............................................. H01C 10/06
[52] U.S. Cl. ....................................... 338/96; 338/99; 338/196
[58] Field of Search ..................... 338/96, 196, 99, 114

[56] References Cited

U.S. PATENT DOCUMENTS

| | | | |
|---|---|---|---|
| 3,736,396 | 5/1973 | Siegel | 338/96 X |
| 4,172,741 | 10/1979 | Johnson | 219/121.68 |
| 4,200,970 | 5/1980 | Schonberger | 338/22 SD X |
| 4,670,734 | 6/1987 | Caddock | 338/61 X |
| 4,780,701 | 10/1988 | Eppinger | 338/96 X |

FOREIGN PATENT DOCUMENTS 2517769 10/1976 Fed. Rep. of Germany .
3500462 7/1986 Fed. Rep. of Germany .

Primary Examiner—Teresa J. Walberg
Assistant Examiner—Marvin M. Lateef
Attorney, Agent, or Firm—Wegner & Bretschneider

[57] ABSTRACT

In the case of a displacement or position transducer, it is provided that a conductor foil (5) is arranged over the resistor track (4), held at a distance from it and able to be pressed with flexible resilience against the resistor track, and that the slide (8) is displaceably arranged above the conductor foil (5), pressing the latter against the resistor track (4), the conductor foil preferably being electrically connected to a conductor track (2) running parallel to the resistor track (4), at a distance from it and electrically separated from it.

11 Claims, 2 Drawing Sheets

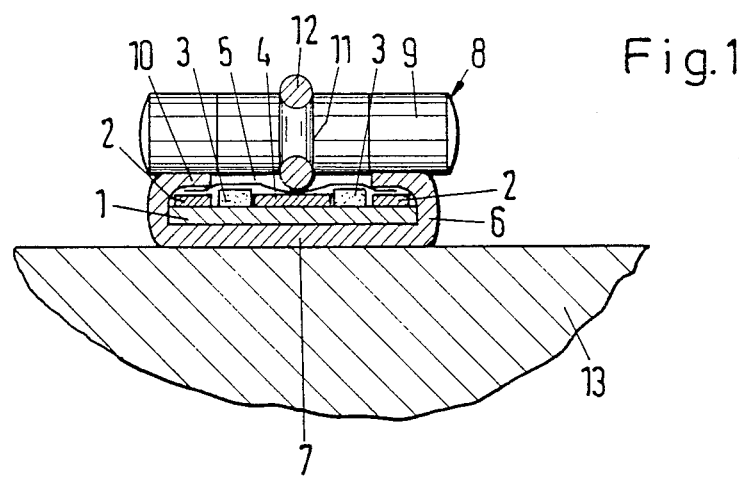
Fig. 1
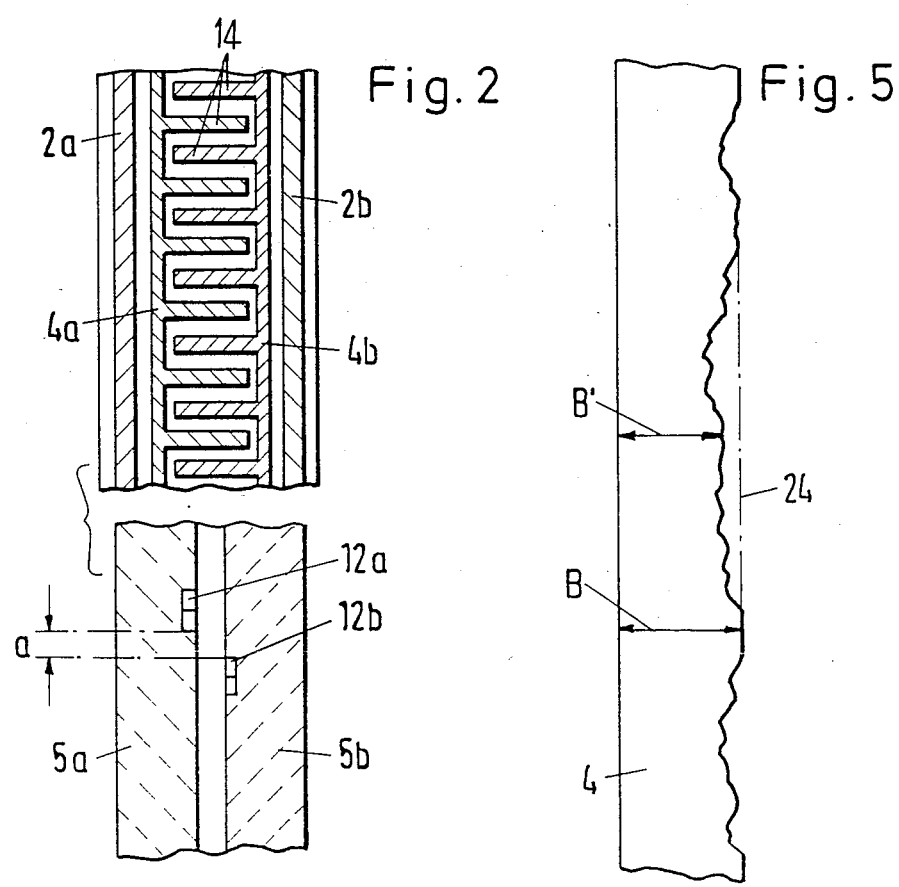
Fig. 2
Fig. 5

DISPLACEMENT OR POSITION TRANSDUCER

The invention relates to a displacement or position transducer, comprising a resistor track provided with voltage terminals and a slide, which can move along the latter and serves as displacement or position sensing element.

Such displacement or position transducers are known in various embodiments. In these, the slide is generally provided with a slide contact which slides along on a resistor track in direct contact with it. Since an unsoiled and uncontaminated surface of the resistor track is of essential importance for a satisfactory functioning of such known devices, in particular for a good reproducibility, in conventional systems the conductor tracks are either accommodated in closed housings, so that in linear systems a push rod connected to the slide then has to be introduced into the housing, or relatively complex cover mechanisms are provided in order to cover that region of the resistor track where the slide can move. To this extent, it is known for example to provide a metal cover foil which is magnetically attracted and is disposed so as to pass through the slide above the slide contact.

Such known systems are accordingly complex in design and expensive in production and at the same time generally are unsuitable for use in areas which are exposed to heavy soiling or a liquid.

Added to this is the fact that slide contacts directly in connection with the resistor track are sensitive to vibrations, so that wearing problems occur in use on vibrating machines or in vehicles, as are described for example in German Auslegeschrift 2,706,760.

Such wearing problems are avoided in the case of optoelectronically operating position transducers, with which on the other hand, however, a relatively high complexity of design is again necessary in order to avoid the incidence of extraneous light and which require a certain amount of electronics for signal processing.

Starting from this situation, the invention is based on the object of designing a displacement or position transducer of the type mentioned at the beginning such that it has sufficient accuracy for many intended applications with a structure which is simple and inexpensive, while at the same time it is in particular to be resistant to vibration and soiling. Such a position transducer is to be suitable primarily for being able, for example, to detect the adjusting movement and position of parts on machines and motor vehicles which can be adjusted by electric motor.

This object is achieved according to the invention by at least one conductor track running parallel to the resistor track, at a distance from it and electrically separated from it, by a conductor foil being arranged over the resistor track, held at a distance from it, electrically connected to the conductor track and able to be pressed with flexible resilience against the resistor track, and wherein the slide is displaceably arranged above the conductor foil, pressing the latter against the resistor track.

This development avoids any direct sliding contact between slide and resistor track, so that wearing effects do not occur. The conductor foil provided according to the invention, either being a metal foil or a plastic film provided with a conductive coating, serves at the same time as absolutely liquid-tight and dust-tight as well as dirt-resistant cover, so that complex design measures for magnetically adhering covers, housing and the like are dispensed with and, at the same time, a tightness of the system up to requirements according to IP 67 is achieved. At the same time, the development according to the invention makes possible a flat construction of low weight with a direct fastening capability directly on the respective test object to be detected. Due to the simple structural design, production can be automated to the greatest extent.

The conductor tracks described are preferably used to achieve good electrical characteristics. However, it is also possible in principle to utilize the electric conductivity of surrounding housing parts or to dimension the conductor foil itself such that it alone ensures an adequate conductivity.

In a further developement of the invention, it is provided that the conductor foil is held at a distance by at least one spacer track of plastic. Such plastic intermediate layers, which are also referred to as spacers, are known from similarly constructed touch contact switches. They take care that a small distance is always maintained between resistor track and conductor track, and thus an electrical separation, so that a defined, small-area contact is established in the region of the slide.

It is advantageously provided that a spacer track and a conductor track are each arranged on either side of the resistor track. This symmetrical construction produces a reliable contact with the conductor tracks.

Conductor tracks, resistor tracks and spacer tracks are favorably arranged on an insulating support body, and the outer edges of the conductor foil and of the support body are embraced by U-shaped housing parts, the upper side of the upper U limb serving as spacer for the rolling slide.

This design measure achieves on the one hand a defined movement of the slide, over a precise distance and thus ensuring a uniform contact pressure, and on the other hand a hermetic sealing of the entire arrangement, safeguarding against mechanical stresses. To achieve an end termination which can be mechanically stressed and is at the same time seal-tight, it may be provided that the ends are encapsulated in plastic by injection molding or casting.

The slide advantageously has a pressure contact in the form of a plastic ring, in particular a silicone ring, rolling on the conductor foil. This design of the pressure contact makes possible a satisfactory, wear-resistant sliding on the conductor foil, it being possible for example for such a silicone ring to be easily fixed on a cut-in groove of a fingerlike part of the resiliently pressed slide, running transversely to the longitudinal direction.

In a suitable embodiment, in particular as digital displacement transducer, it is provided that the resistor track has comblike teeth projecting transversely to the longitudinal direction, the slide pressing the conductor foil only along the tooth region. This has the effect that, during a movement of the slide along the resistor track, a sequence of digital voltage signals is emitted, which can be digitally further processed directly. In this case, the resistor track can be such a track in the narrower sense of the word, it then being possible to obtain on the one hand, during the displacement, a digital movement signal and on the other hand, dependent on the voltage divider function of the resistor track, an analog final position signal, thereby opening up completely novel application possibilities.

If, in comparison, a resistor track with very low resistance, i.e. ultimately likewise a conductor track, is used as resistor track, it is possible to operate with purely digital signal processing if the evaluation device also comprises a memory.

To achieve a signal criterion for the respective direction of movement (forwards-backwards) it is provided that two electrically mutually separated, comblike resistor tracks are arranged intermeshing, that each resistor track is assigned a separate conductor track, that the conductor foil comprises two mutually insulated conductor regions, and that each conductor region is assigned a separate pressure contact of the slide, the pressure contacts being offset with respect to each other in longitudinal direction.

A further embodiment with circularly arranged resistor tracks provides that the slide is arranged on a central swivel axis and the swivel axis is provided with a resilient cover enclosing the slide and the conductor and resistor tracks. This has the effect of achieving a particularly compact and simple, and mechanically stable construction.

Within the scope of the invention, the resistor tracks may, in a known way, consist of conductive plastic. In this case, it is advantageously provided that the resistance per length of the resistor track is made to remain uniform by corresponding reduction of the width. This means that production-dependent deviations in the length-specific resistance along the resistor track are corrected by the width of the resistor track being correspondingly changed or cut into.

The direct proportionality between the length-specific resistance and the width of the resistor track is utilized in a process for the production of a resistor track of conductive plastic film, it being provided, to achieve a uniform resistance per unit length, that the resistance per unit length is measured continuously along the plastic strip and, for correction, at least one side edge is removed by a ceramic cutting device controlled dependently on the measured resistance value.

By providing such a ceramic cutting device, which is electrically non-conducting, on the one hand a high and precise removal is ensured and on the other hand the continuous resistance measurement is not affected.

In a completely analogous way, the specific resistance of a printed-on conductor track can be adjusted by partial removal with the aid of a laser.

In an alternative embodiment of the displacement and position transducer according to the invention, in which the latter serves as a so-called graph tablet for the input of data into a data processing device, it is provided that the resistor track is designed as a two-dimensional resistor track network, that a flexibly braced conductor foil is arranged above the latter and that the slide is designed as a scanning device which can move above the resistor track network and can be pressed against the contact foil.

Such an arrangement can be produced extremely inexpensively in comparison with comparable arrangements. The bracing provided holds the conductor foil against the resistor track network in electrically insulated manner. In this embodiment, the slide can, in the simplest case, be designed as a type of pen which is pressed against the conductor foil so that a punctiform contact is thereby established.

Figure 4:
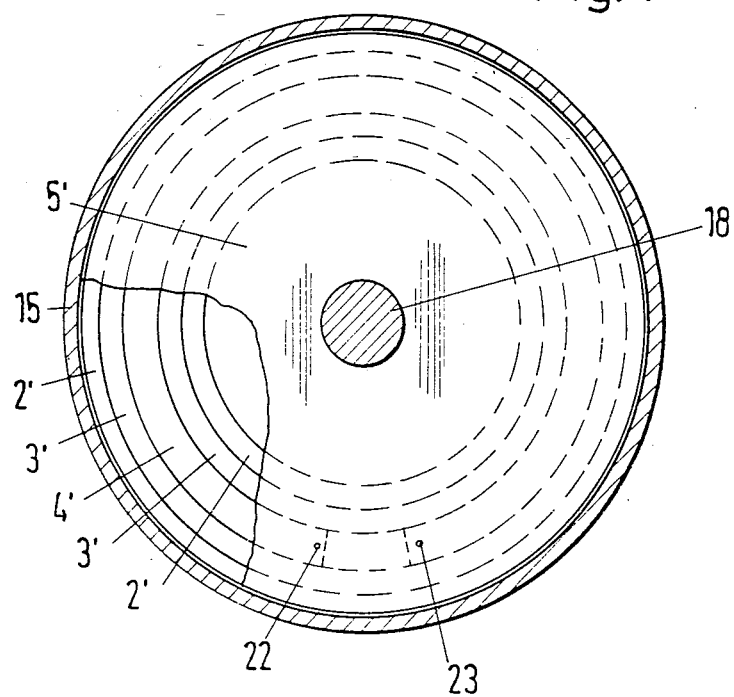

Further features, advantages and details of the invention emerge from the following description of a preferred embodiment with reference to the drawing, in which:

FIG. 1 shows a section through a first embodiment of a displacement or position transducer according to the invention, FIG. 2 shows a diagrammatic plan view of a second embodiment, without conductor foil and with conductor foil, FIG. 3 shows a section through a third embodiment, FIG. 4 shows a plan view of the conductor and resistor tracks in the embodiment according to FIG. 3, and FIG. 5 shows a representation of a resistance-corrected resistor track of conductive plastic.

In the embodiment represented in FIG. 1, on a support body 1 there are arranged, running longitudinally next to each other from left to right in FIG. 1, a conductor track 2, a spacer track 3, a resistor track 4, a further spacer track 3 and a further conductor track 2. Above these tracks, there extends over them a conductor foil 5, which rests against the conductor tracks 2 and is accordingly electrically connected to the latter and which is held by the spacer tracks 3, in the basic state, at a distance from the resistor track 4, i.e. the height of the spacer tracks 3 is somewhat greater than the height of the resistor track 4.

Cross-sectionally U-shaped housing parts 6, which are connected on the underside by a base plate 7, surround the support body 1 and the conductor foil 5 as well as the two outer conductor tracks 2, electrically insulated from the latter.

A slide 8 is arranged longitudinally displaceably above the resistor track 4 and conductor tracks 2, longitudinally running perpendicular to the plane of the drawing in FIG. 1, a transversely running finger part 9 being pressed resiliently in place, rolling on the upper side of the upper U limb 10 of the housing parts 6 and with a defined distance from the conductor foil 5. The finger part 9 is provided with an annular groove 11, which serves to receive a pressing ring 12 in the form of a silicone ring. The conductor foil 5 is pressed in punctiform contact against the resistor track 4 by this silicone ring rolling on it.

The resistor track 4 is provided at its ends with voltage terminals, not shown in detail. A further voltage terminal is connected to the conductor tracks 2, which are also interconnected to increase the reliability of the system on account of the symmetrical design. The pressing ring 12 accordingly creates a variable center tap of the voltage divider system, an electric contact being established via the conductor foil 5 between a defined point along the resistor track 4 and the conductor tracks 2. The voltage picked off between the conductor tracks 2 and one end of the resistor track 4 in relation to the total applied voltage is accordingly directly proportional to the distance between the pressure contact 12 and the end of this conductor track in relation to the total travelling length of the displacement transducer.

The arrangement represented in FIG. 1 can be arranged directly in the region of the object to be measured, in particular a motor vehicle seat. In this case, the system can, for example, be fixed on the motor vehicle floor 13, it being possible for the finger part of the slide to be connected directly to the motor vehicle seat, which is mounted so as to be longitudinally displaceable by electric motor.

In the embodiment diagrammatically represented in FIG. 2, two mutually separated resistor tracks 4a and 4b are provided, which in each case have a plurality of equidistant teeth 14, perpendicular to the longitudinal extent. The conductor tracks 2 are designed as two electrically separated conductor tracks 2a and 2b. The covering conductor foil 5 is also electrically separated into conductor foil regions 5a and conductor foil regions 5b. The slide 8 comprises two pressure rollers 12a and 12b, which are arranged at a distance a from each other and are in each case assigned to one of the longitudinally divided conductor foil regions 5a and 5b.

This development has the effect that, during the longitudinal displacement of the slide 8, a sequence of voltage pulses is alternately emitted via the resistor track 4a, the conductor foil region 5a and the conductor track 2a, and on the other hand the resistor track 4b, the conductor foil region 5b and the conductor track 2b.

A direction-of-movement signal can be obtained from these signals or the signal sequence by an electronic evaluation device.

In FIGS. 3 and 4, an embodiment as angle-of-rotation transducer is represented. A base plate 1' of epoxy resin or hardboard bears, arranged circularly from outside to inside and concentric to one another, an outer conductor track 2', a spacer track 3', a resistor track 4', a further spacer track 3' and an inner conductor track 2'. These are covered by a circular disc-shaped conductor foil 5'. A housing 7' has a beaded rim 15, which closes around the conductor foil 5'. In the base plate 16, a central bore 17 is provided, through which a shaft 18 is passed, the angle-of-rotation position of which is to be detected. At the end of the shaft 18, a cover 19 is provided, which closes over the housing 7' and is screwed to the shaft 18 by means of a screw 20. On a rotatably mounted crossbar 21 of the resilient cover 19 there is fixed, by means of an annular groove, a pressure contact 12', which presses onto the conductor foil 5' and in this way establishes a point contact with the resistor track 4'. At the ends of the resistor track 4', voltage terminals 22, 23 are provided.

In FIG. 5, a plastic strip, suitable as resistor track 4, is diagrammatically represented. This plastic strip may have different resistances per unit length due to inhomogeneities in the composition and production-dependent variations in thickness along the strip. According to the invention, this is compensated by the resistance per unit length being continuously measured by a measuring device and subsequently at least one edge 24 being removed by a removal device proportionally to any locally reduced resistance, from the original width B to a locally changing reduced width B', by means of a ceramic cutting knife, which itself is non-conducting and consequently does not affect the conductivity measurements.

I claim:

1. A displacement or position transducer, comprising a resistor track provided with voltage terminals and a slide, which can move along the latter and serves as displacement or position sensing element, wherein a conductor foil is arranged over the resistor track, held at a distance from the resistor track by at least one spacer track of flexible plastic and able to be pressed with flexible resilience against the resistor track, and wherein the slide is displaceably arranged above the conductor foil, pressing the latter against the resistor track.

2. A displacement or position transducer as claimed in claim 1, wherein a spacer track and a conductor track are each arranged on either side of the resistor track.

3. A displacement or position transducer as claimed in claim 1, wherein conductor tracks, resistor track and spacer tracks are arranged on an insulating support body, and the outer edges of the conductor foil and of the support body are embraced by U-shaped housing parts, the upper side of the upper U limb serving as guide track and spacing piece for the slide.

4. A displacement or position transducer as claimed in claim 1, wherein the slide has a pressure contact in the form of a plastic ring, rolling on the conductor foil.

5. A displacement or position transducer as claimed in claim 1, wherein the resistor track has teeth projecting comblike transversely to the longitudinal direction, the slide pressing the conductor foil only along the tooth region.

6. A displacement or position transducer as claimed in claim 6, wherein two electrically mutually separated, comblike resistor tracks are arranged intermeshing, wherein each resistor track is assigned a separate conductor track, wherein the conductor foil comprises two mutually insulated conductor regions, and wherein each conductor region is assigned a separate pressure contact of the slide, the pressure contacts being offset with respect to each other in a longitudinal direction.

7. A displacement or position transducer as claimed in claim 1, the resistor tracks being arranged circularly, wherein the pressure contact is arranged capable of swiveling about a central shaft and the shaft is provided with a resilient cover enclosing the pressure contact and the conductor and resistor tracks.

8. A displacement or position transducer as claimed in claim 1, wherein the resistor track consists of conductive plastic.

9. A displacement or position transducer as claimed in claim 8, wherein the resistance per length of the resistor track is made to remain uniform by corresponding reduction of the width.

10. Displacement or position transducer as claimed in claim 1, wherein the resistor track is designed as a two-dimensional resistor track network, wherein a flexibly braced conductor foil is arranged above the latter and wherein the slide is designed as a scanning device which can move above the resistor track network and can be pressed against the conductor foil.

11. A displacement or position transducer, comprising a resistor track provided with voltage terminals and a slide, which can move along the latter and serves as displacement or position sensing element, wherein a conductor foil is arranged over then resistor track, held at a distance from the resistor track by at least one spacer track of flexible plastic and able to be pressed with flexible resilience against the resistor track, and wherein the slide is displaceable arranged above the conductor foil, pressing the latter against the resistor track, the conductor foil being electrically connected to a conductor track running parallel to the resistor track, at a distance from the resistor track and electrically separated from the resistor track.

* * * * *